(12) United States Patent
Bachl et al.

(10) Patent No.: US 8,125,947 B2
(45) Date of Patent: Feb. 28, 2012

(54) MAPPING CONTROL INFORMATION TO A DEDICATED PHYSICAL CONTROL CHANNEL

(75) Inventors: Rainer Bachl, Nuremberg (DE); Jens Mueckenheim, Nuremberg (DE); Mirko Schacht, Nuremberg (DE)

(73) Assignee: Alcatel Lucent, Paris (FR)

( * ) Notice: Subject to any disclaimer, the term of this patent is extended or adjusted under 35 U.S.C. 154(b) by 1171 days.

(21) Appl. No.: 11/241,241

(22) Filed: Sep. 30, 2005

(65) Prior Publication Data

US 2007/0076654 A1  Apr. 5, 2007

(51) Int. Cl.
*H04W 4/00* (2009.01)
*H04W 72/00* (2009.01)

(52) U.S. Cl. .................. 370/329; 455/450; 455/451

(58) Field of Classification Search .................. 370/329; 455/436–440, 442, 447, 450–451, 452.1
See application file for complete search history.

(56) References Cited

U.S. PATENT DOCUMENTS

| 5,463,628 | A | * | 10/1995 | Sorensen | 370/467 |
| 6,477,176 | B1 | * | 11/2002 | Hamalainen et al. | 370/435 |
| 2002/0094834 | A1 | * | 7/2002 | Baker et al. | 455/522 |
| 2003/0063595 | A1 | * | 4/2003 | You et al. | 370/342 |
| 2003/0104816 | A1 | * | 6/2003 | Duplessis et al. | 455/448 |
| 2005/0068921 | A1 | * | 3/2005 | Liu | 370/335 |

* cited by examiner

*Primary Examiner* — Patrick Edouard
*Assistant Examiner* — Matthew Genack
(74) *Attorney, Agent, or Firm* — Williams, Morgan & Amerson, PC (57) ABSTRACT

The present invention provides a method of wireless communication involving at least one mobile unit and at least one base station configured to transmit data over first and second data channels and corresponding first and second control channels. The method includes accessing control information associated with data to be transmitted over the first data channel and mapping the control information to a portion of the second control channel.

16 Claims, 5 Drawing Sheets

MAPPING CONTROL INFORMATION TO A DEDICATED PHYSICAL CONTROL CHANNEL

BACKGROUND OF THE INVENTION

1. Field of the Invention

This invention relates generally to communication systems, and, more particularly, to wireless communication systems.

2. Description of the Related Art

Conventional wireless communication systems include one or more base stations, which may also be referred to as access points or node-Bs or access networks, for providing wireless connectivity to one or more mobile units, which may also be referred to using terms such as user equipment, subscriber equipment, and access terminals. Exemplary mobile units include cellular telephones, personal data assistants, smart phones, text messaging devices, laptop/notebook computers, desktop computers, and the like. Each base station may provide wireless connectivity to one or more mobile units, such as the mobile units in a geographical area, or cell, associated with the base station. For example, a base station may provide wireless connectivity to mobile units located in a cell according to a Universal Mobile Telecommunication System (UMTS) protocol.

In operation, each mobile unit maintains a wireless communication link, or leg, with one or more base stations. The wireless communication link typically includes one or more uplink and/or downlink channels for transmitting data and control information. Versions of the UMTS protocol prior to version 6 implement uplink and downlink dedicated channels (DCH) for transmitting data and/or control information between the mobile units and the base stations. A dedicated physical control channel (DPCCH) carries the DCH control information, such as pilot bits, transmit power control (TPC) bits, transport format combination information (TFCI), and the like that may be used on the uplink and/or downlink DCH. The DPCCH includes dedicated fields for carrying the DCH control information. A dedicated physical data channel (DP-DCH) carries the DCH data.

Version 6 of the UMTS protocol includes many enhancements over previous versions of the UMTS protocol, some of which are intended to provide more efficient support for packet-switched networks. The enhanced dedicated channel (E-DCH) is an enhancement of the dedicated channel (DCH) that may provide more efficient support for the transmission of packet-switched data over the uplink. The High-Speed Downlink Shared Channel (HS-DSCH) may increase the efficiency of the packet-switched data transmission in the downlink as compared to the dedicated channels. On the physical layer, E-DCH data is transmitted over an enhanced dedicated physical data channel (E-DPDCH).

Additional physical control channels have also been included in Version 6 of the UMTS protocol, at least in part because E-DCH introduces new physical layer (PHY) and medium access control (MAC) layer functionalities, such as hybrid ARQ (HARQ) and dynamic scheduling. For example, the following physical control channels may be available in UMTS, version 6:

An uplink enhanced dedicated physical control channel (E-DPCCH), which may be used for signaling E-DCH transport format combination information (E-TFCI), a retransmission sequence number (RSN) that mobile units may use on the E-DPDCH, and a happy bit.

A downlink HARQ Indicator Channel (E-HICH), which may carry ACK/NACK information for the hybrid ARQ protocol.

A downlink Absolute Grant Channel (E-AGCH), which may be used for signaling the absolute grant (AG), which is a product of the scheduling process.

A downlink Relative Grant Channel (E-RGCH), which may be used for the signaling of relative grants (RG), which is a product of the scheduling process.

These channels typically consume uplink and/or downlink resources. Consequently, usage of E-DCH control channels may reduce the efficiency of the wireless communication system and/or the capacity available to the uplink and downlink data channels. The decreases in efficiency and/or data traffic capacity may be especially important when a relatively small amount of data is sent (compared to the amount of control information) and the signaling overhead becomes significant relative to the amount of transmitted data. The presence of both DCH and E-DCH data and control channels may also increase interference levels in the wireless communication system.

Introduction of the enhanced data channel and associated control channels may make portions of existing, or legacy, channels redundant. For example, the E-DCH may be used to transmit data and/or control signals over the uplink and the HS-DSCH may be used to transmit data and/or control signals over the downlink. Consequently, the DCH (and associated data and/or control channels) may not be used to transmit data and/or portions of the control information. However, the DPCCH may still be utilized to transmit pilot signal information. Thus, the transport format combination information fields of the DPCCH may become redundant. Transmitting the redundant field(s) may increase the overhead associated with the wireless communication link, which may decrease the efficiency of transmissions over the wireless communication link and/or the capacity of the wireless communication link.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a method is provided for wireless communication involving at least one mobile unit and at least one base station configured to transmit data over first and second data channels and corresponding first and second control channels. The method may include accessing control information associated with data to be transmitted over the first data channel and mapping the control information to a portion of the second control channel.

In one embodiment of the present invention, a method is provided for wireless communication involving a radio network controller, at least one mobile unit and at least one base station configured to transmit data over a first data channel and control information associated with the data over a first control channel. The method may include determining that control information associated with data to be transmitted over the first data channel is to be mapped to a portion of a second control channel. The method may also include providing information to at least one mobile unit and at least one base station indicating that control information associated with data to be transmitted over the first data channel is to be mapped to the portion of the second control channel.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
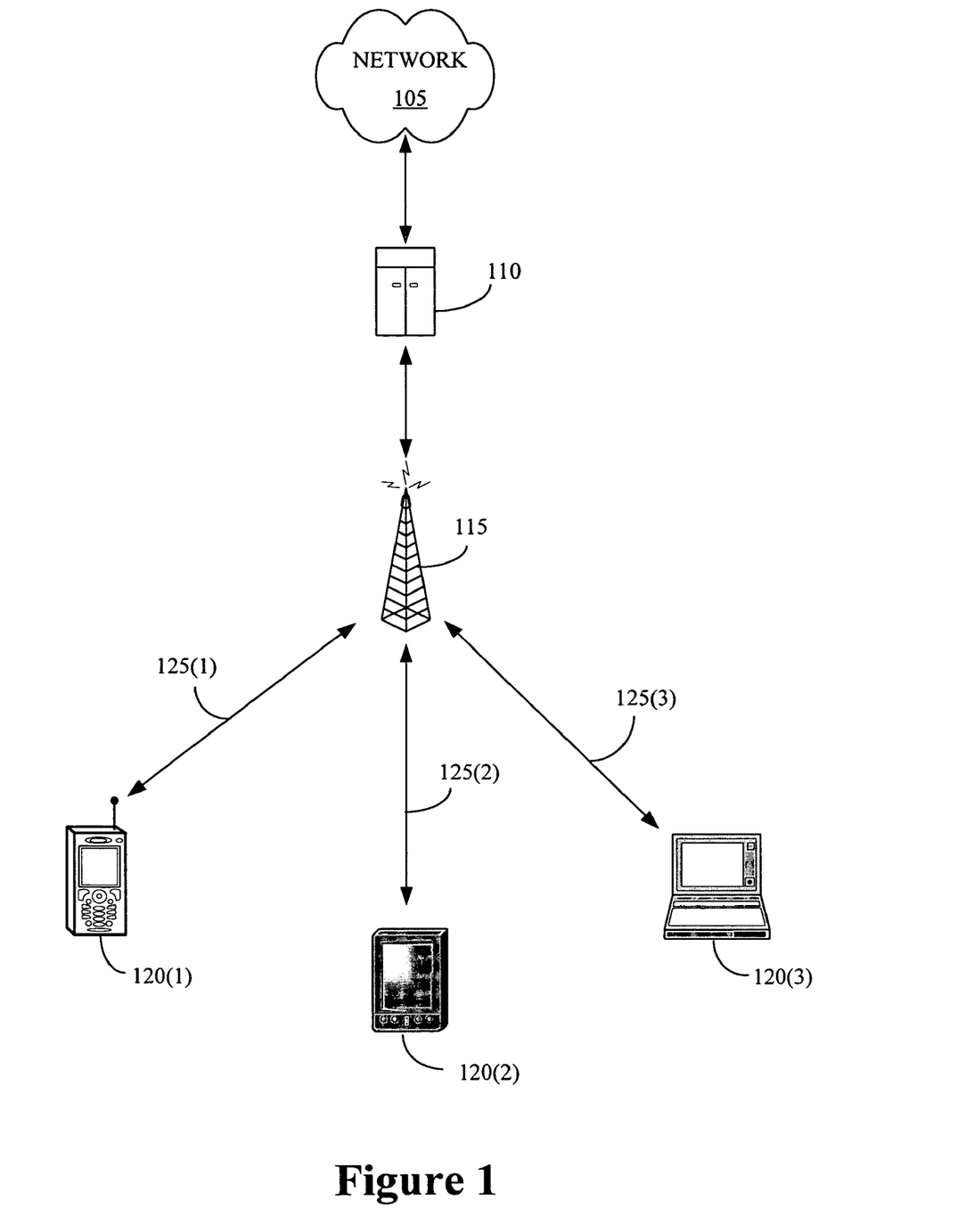
FIG. 1 shows one exemplary embodiment of a communication system, in accordance with the present invention.

Referring now to FIG. 1, one exemplary embodiment of a communication system 100 is shown. In the illustrated embodiment, the communication system 100 includes a network 105 that is communicatively coupled to a network controller 110. Although a single network controller 110 is shown in FIG. 1, persons of ordinary skill in the art having benefit of the present disclosure should appreciate that any number of network controllers 110 may be communicatively coupled to the network 105. In the illustrated embodiment, the communication system 100 operates according to a Universal Mobile Telecommunication Systems (UMTS) protocol. Accordingly, the network 105 may also be referred to as the core network 105 and the network controller 110 may be a Radio Network Controller (RNC) 110. However, persons of ordinary skill in the art should appreciate that the present invention is not limited to communication systems 100 that operate according to the UMTS protocol. In alternative embodiments, the communication system 100 may operate according to protocols such as a Global System for Mobile communications (GSM) protocol, a Code Division Multiple Access (CDMA or CDMA 2000) protocol, an Evolution, Data Only (EVDO) protocol, a protocol based on one or more of the IEEE 802 standards, a Bluetooth protocol, and the like. Furthermore, the network 105 and/or the network controller 110 may, in alternative embodiments, include wired connections that operate according to one or more wired communication systems.

The network controller 110 is communicatively coupled to a base station 115. However, persons of ordinary skill in the art having benefit of the present disclosure should appreciate that the network controller 110 may be coupled to any number of base stations 115. The network 105, the network controller 110 and/or the base station 115 provide wireless connectivity according to one or more wireless communication protocols, such as the protocols discussed above. In embodiments that operate according to the UMTS protocol, the network 105, the network controller 110, and the one or more base stations 115 may be referred to collectively as the UMTS Terrestrial Radio Access Network (UTRAN). In various alternative embodiments, the UTRAN may also include one or more of the interfaces between the network 105, the network controllers 110, and/or the base stations 115.

The communication system 100 includes one or more mobile units 120(1-3). In the interest of clarity, the indices (1-3) will be used when the mobile units 120(1-3) are referred to individually or in subsets, but the indices (1-3) may be dropped when the mobile units 120 are referred to collectively. The same convention may be applied to other numbered elements referred to below. Exemplary mobile units 120 include, but are not limited to, mobile phones 120(1), personal data assistants 120(2), smart phones (not shown), text messaging devices (not shown), laptop computers 120(3), desktop computers (not shown), and the like. In the interest of clarity, only three mobile units 120 are shown in FIG. 1. However, persons of ordinary skill in the art having benefit of the present disclosure should appreciate that the communication system 100 may include any number of mobile units 120 of any type.

The mobile units 120 may form one or more wireless communication links 125 with the base station 115, which may provide access to the network 105 via the network controller 110. In the illustrated embodiment, the wireless communication links 125 may include one or more uplinks and one or more downlinks. The mobile units 120 and the base station 115 are able to transmit information over the wireless communication links 125 using at least two types of channels. In one embodiment, the mobile units 120 and the base station 115 are able to transmit information over the wireless communication links 125 using a dedicated channel (DCH) and an enhanced dedicated channel (E-DCH), such as the dedicated channels defined by the legacy UMTS protocol, and the enhanced dedicated channels defined by the Release 6 UMTS protocol. Portions of the control channels of the dedicated channels are redundant and, in some embodiments, the network controller 110 configures one or more of the mobile units 120 and the base station 115 to map control information associated with data to be transmitted over a data channel associated with one of the dedicated channels to a portion of a control channel associated with one of the other control channels. The mobile units 120 and/or the base station 115 may then transmit data and control information over a reduced number of channels, as will be discussed in detail below.

Figure 2A:
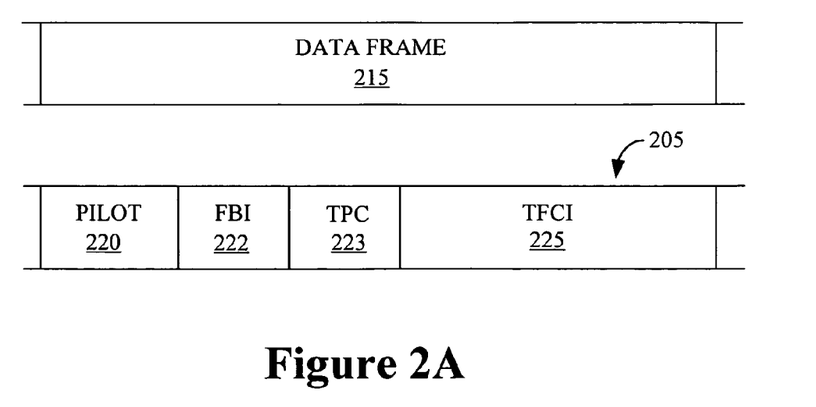
FIGS. 2A, 2B, and 2C conceptually illustrate uplink data channels and uplink control channels associated with two dedicated channels, in accordance with the present invention.

FIG. 2A conceptually illustrates an uplink data channel 200 and an uplink control channel 205 associated with a first dedicated uplink channel. For example, in a UMTS system, the uplink data channel 200 may be a dedicated physical data channel (DPDCH), the uplink control channel 205 may be a dedicated physical control channel (DPCCH), and the first dedicated uplink channel may be a dedicated channel (DCH). In the illustrated embodiment, each frame of the uplink data channel 200 may include a data frame 215. Each frame of the uplink control channel 205 includes a pilot signal field 220, a feedback indicator (FBI) field 222, a transmit power control (TPC) field 223, and a control information field 225, such as a transport format combination indicator (TFCI) field 225. However, persons of ordinary skill in the art should appreciate that the uplink data channel 200 and the uplink control channel 205 are intended to be illustrative and not to limit the present invention. In alternative embodiments, the uplink data channel 200 and/or the uplink control channel 205 may include more or fewer fields than shown in FIG. 2A. In one embodiment, the uplink control channel 205 uses a 10 ms transmit time interval (TTI).

Figure 2B:
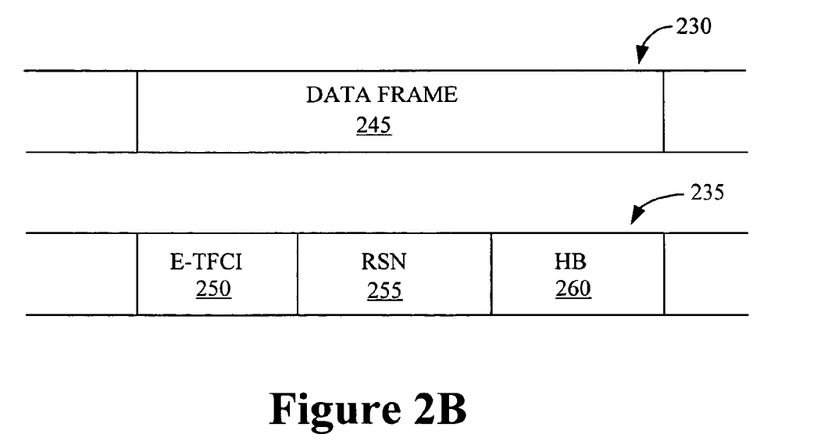

FIG. 2B conceptually illustrates an uplink data channel 230 and an uplink control channel 235 associated with a second dedicated uplink channel. For example, in a Version 6 UMTS system, the uplink data channel 230 may be an enhanced dedicated physical data channel (E-DPDCH), the uplink control channel 235 may be an enhanced dedicated physical control channel (E-DPCCH), and the second dedicated uplink channel may be an enhanced dedicated channel (E-DCH). In the illustrated embodiment, each frame of the uplink data channel 230 may include a data frame 245. Each frame of the uplink control channel 235 includes one or more control information fields, such as an extended transport format combination information (E-TFCI) field 250, a retransmission sequence number (RSN) field 255, and a happy bit (HB) field 260. However, persons of ordinary skill in the art should appreciate that the uplink data channel 230 and the uplink control channel 235 are intended to be illustrative and not to limit the present invention. In alternative embodiments, the uplink data channel 230 and/or the uplink control channel 235 may include more or fewer fields than shown in FIG. 2B. In one embodiment, the uplink control channel 235 uses a 2 ms transmit time interval (TTI). Alternatively, the uplink control channel 235 may use a 10 ms TTI.

Figure 2C:
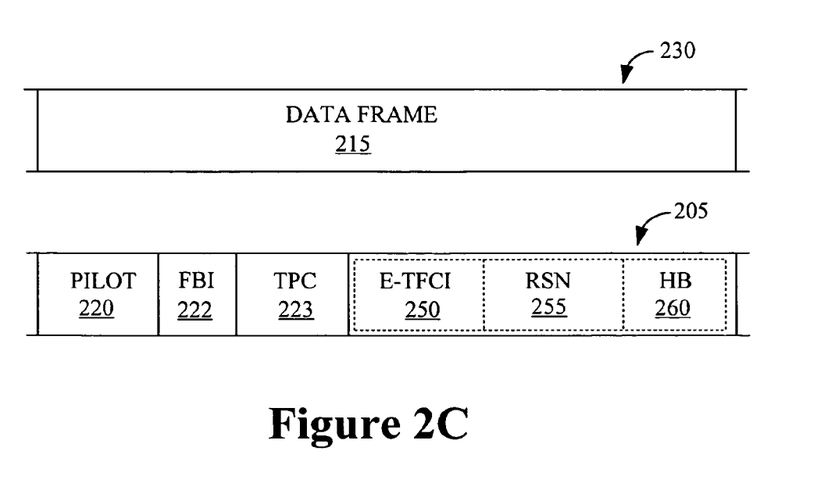

FIG. 2C conceptually illustrates the uplink data channel 230 associated with the second dedicated uplink channel and the uplink control channel 205 associated with the first dedicated uplink channel. In the illustrated embodiment, control information associated with the second uplink data channel 230 is mapped into a portion of the uplink control channel 205. For example, information in the E-DCH transport format combination indication (E-TFCI) field 250, the retransmission sequence number (RSN) field 255, and the happy bit (HB) field 260 may be mapped into the transport format combination indication field 225 of the uplink control channel 205. In one embodiment, the control information associated with the second uplink data channel 230 is mapped into a single frame and/or subframe of the uplink control channel 205.

The mapping of the control information associated with the second uplink data channel 230 into the single frame and/or subframe of the uplink control channel 205 may depend upon the transmit time interval (TTI) associated with the uplink data channel 230 and/or the uplink control channel 205. In one embodiment, the uplink data channel 230 has a 10 ms TTI length which corresponds to the frame duration of the uplink control channel 205. The control information can therefore be spread over the entire frame of the uplink control channel 205, which may then be time-aligned to the uplink data channel 230. For example, in a UMTS system, the DPCCH frame setting(s) may be unchanged and the E-DCH control information may be conveyed via the DPCCH on a 10 ms time period. However, if the E-DCH control information needs to be updated more often than every 10 ms, the E-DCH control information can be signaled over E-DPCCH. In that case, the E-DCH control information may be accessed from the E-DPCCH. Accordingly, when the E-DPCCH is sent it may be prioritized over DPCCH. If no E-DPCCH transmission is detected, DPCCH information may be considered.

In one alternative embodiment, the uplink data channel 230 implements a 2 ms E-DCH TTI length and the uplink control channel 205 has a 10 ms frame duration. The frames of the uplink control channel 205 may therefore be divided into subframes of 2 msec, each of which may be aligned with an associated subframe of the uplink data channel 230. For example, in a UMTS system, the E-DCH control information that corresponds to a specific E-DPDCH subframe may be signaled in an associated DPCCH subframe. In some embodiments, a size of an E-TFCI codebook may be reduced to permit transmission using the number of TFCI bits available on the uplink data channel 230 (e.g., the DPCCH) within 2 ms.

Figure 3:
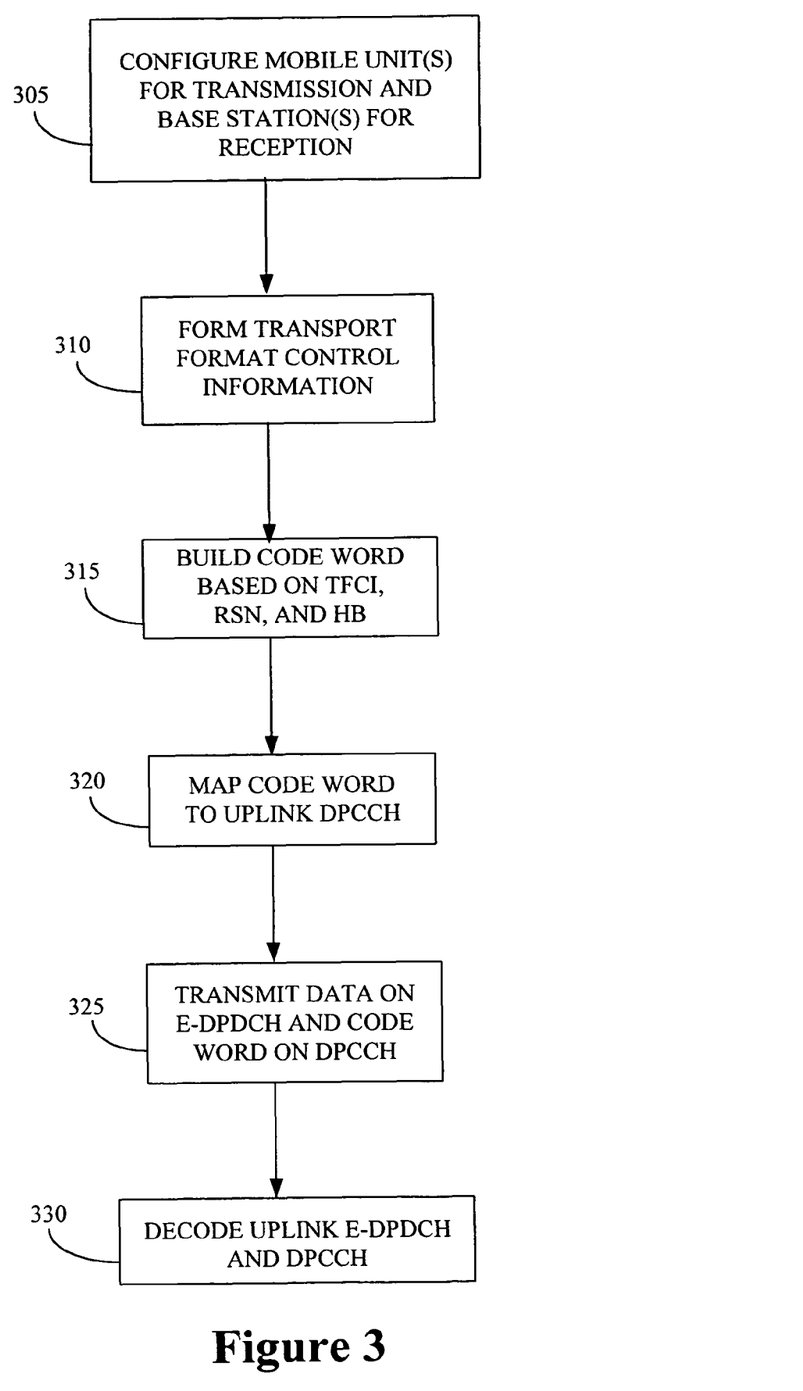
FIG. 3 conceptually illustrates one exemplary embodiment of a method of mapping control information to an uplink control channel, in accordance with the present invention.

FIG. 3 conceptually illustrates one exemplary embodiment of a method 300 for mapping control information to an uplink control channel. In the illustrated embodiment, one or more mobile units are configured (at 305) for transmission over the uplink channels and one or more base stations are configured (at 305) for reception over the uplink channels. For example, in a UMTS system, a radio network controller determines that an uplink DPCCH should be used for sending the control information (e.g., an extended transport format combination information field, a retransmission sequence number field, and a happy bit) associated with data to be transmitted on the E-DPDCH. The radio network controller may make this determination at setup of an E-DCH transport channel and/or during the lifetime of an already existing E-DCH.

The radio network controller (RNC) may then provide information to the mobile units, which may use the provided information to configure (at 305) the mobile unit to transmit the control information on the uplink DPCCH. The radio network controller (RNC) may also provide information to the base station(s), which may use the provided information to configure (at 305) the base station(s) to receive the control information. For example, the radio network controller may signal the configuration to the mobile unit(s) and the base station(s) using radio resource control (RRC) protocol and node-B application protocol (NBAP) signaling, respectively. After successful reception of the messages and configuration (at 305), the mobile units will be configured to transmit the control information over the uplink DPCCH instead of the uplink E-DPCCH, and the base stations will be configured to receive the control information over the uplink DPCCH instead of the uplink E-DPCCH.

The mobile unit may form (at 310) control information such as EDCH transport format combination information (E-TFCI), the RSN, and the happy bit. For example, in a UMTS system, when the mobile unit decides to transmit a certain amount of data over the E-DPDCH, it may create (at 310) an E-TFCI, which also contains the amount of data sent. The meaning of the E-TFCI needs to be known by the mobile unit and the base station and so the meaning of the E-TFCI is signaled when the communication link is set up or re-configured. The mobile unit builds (at 315) a code word from the control information, which may include E-TFCI information, the RSN, and the happy bit. Techniques for building (at 315) the code word are known to persons of ordinary skill in the art and will not be discussed herein.

The code word may then be mapped (at 320) into one or more fields of the appropriate uplink data channel. For example, in a UMTS system, the code word may be mapped (at 320) into the TFCI fields on the uplink DPCCH. The mobile unit may then transmit (at 325) the data using an uplink data channel associated with a first dedicated channel and may transmit (at 325) the code word using an uplink control channel associated with a second dedicated channel. For example, in a UMTS system, the mobile unit transmits (at 325) the data on the uplink E-DPDCH and transmits (at 325) the control information on an associated uplink DPCCH.

The base station may decode (at 330) the data received on the uplink data channel associated with the first dedicated channel and may decode (at 330) the code word received on the uplink control channel associated with the second dedicated channel. For example, in a UMTS system, the base station decodes (at 330) the data received on the uplink E-DPDCH and decodes (at 330) the code word received on the associated uplink DPCCH. The decoded code word may then be used to determine the control information, such as the E-TFCI, the RSN, and the happy bit. In one embodiment, the method 300 may be transparent to conventional techniques for transmitting data on the E-DPDCH and control information on the E-DPCCH. Furthermore, the uplink control channel (e.g., the DPCCH) may be time-aligned to the uplink data channel (e.g., the E-DPDCH), and so the time relation between data and control information can be easily maintained.

Figure 4A:
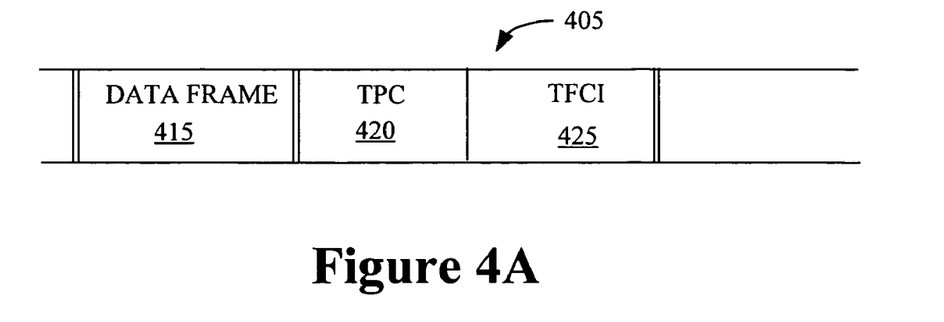
FIGS. 4A, 4B, and 4C conceptually illustrate downlink data channels and downlink control channels associated with two dedicated channels, in accordance with the present invention.

FIG. 4A conceptually illustrates a downlink data channel 400 and a downlink control channel 405 associated with a first dedicated downlink channel. For example, in a UMTS system, the downlink data channel 400 may be a dedicated physical data channel (DPDCH), the downlink control channel 405 may be a dedicated physical control channel (DPCCH), and the first dedicated downlink channel may be a dedicated channel (DCH). The downlink data channel 400 and the downlink control channel are time-multiplexed, as indicated by the double lines. In the illustrated embodiment, each frame of the downlink data channel 400 includes a data frame 415. Each frame of the downlink control channel 405 includes one or more control information fields 420, 425, such as a transmit power control field (TPC) 420 and a transport format combination indication (TFCI) field 425. However, persons of ordinary skill in the art should appreciate that the downlink data channel 400 and the downlink control channel 405 are intended to be illustrative and not to limit the present invention. In alternative embodiments, the downlink data channel 400 and/or the downlink control channel 405 may include more or fewer fields than shown in FIG. 4A, and may be multiplexed in any manner. In one embodiment, the downlink control channel 405 uses a 10 ms transmit time interval (TTI).

Figure 4B:
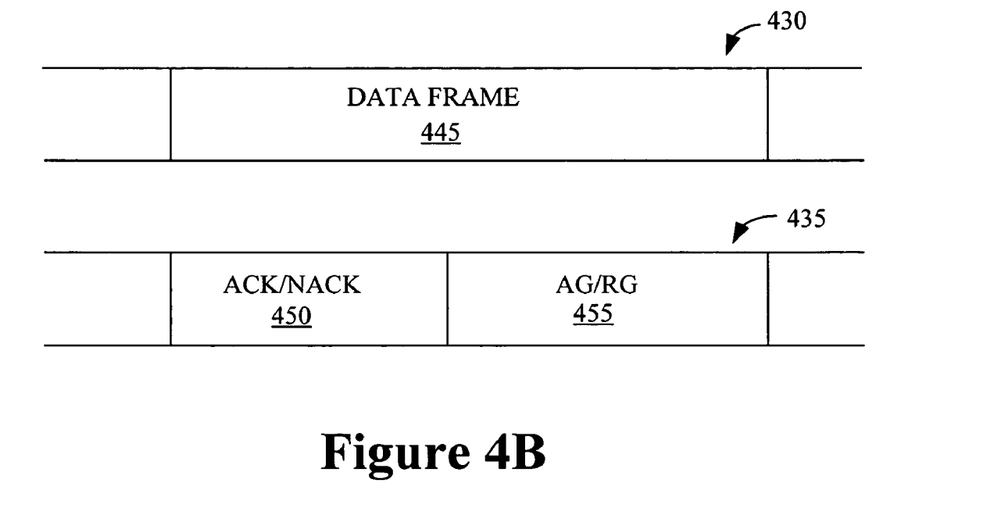

FIG. 4B conceptually illustrates a downlink data channel 430 and a downlink control channel 435 that carries information associated with a dedicated uplink channel. In one embodiment, the downlink control channel 435 may include an E-DCH HARQ indicator channel (E-HICH), an E-DCH relative grant channel (RGCH), an E-DCH absolute grant channel (AGCH), and the like, which may be associated with the uplink data channel E-DPDCH. In the illustrated embodiment, each frame of the downlink data channel 430 includes a data frame 445. Each frame of the downlink control channel 435 includes one or more control information fields, such as an acknowledgment/negative acknowledgement (ACK/NACK) field 450, an absolute grant/relative grant (AG/RG) field 455, and the like. However, persons of ordinary skill in the art should appreciate that the downlink data channel 430 and the downlink control channel 435 are intended to be illustrative and not to limit the present invention. In alternative embodiments, the downlink data channel 430 and/or the downlink control channel 435 may include more or fewer fields than shown in FIG. 4B. In one embodiment, the downlink control channel 435 uses a 2 ms transmit time interval (TTI). Alternatively, the downlink control channel 435 may use a 10 ms TTI.

The acknowledgment/negative acknowledgement (ACK/NACK) field 450 and the absolute grant/relative grant (AG/RG) field 455 are used to control transmissions on the uplink, such as data transmitted on the uplink data channel E-DPDCH. For example, the acknowledgment/negative acknowledgment (ACK/NACK) field 450 may be used to as an acknowledgement whether data was correctly received in the uplink. For another example, the absolute grant (AG) field 455 may be used to determine the data rate for transmissions on the uplink. For yet another example, the relative grant (RG) field 455 may be used to determine an increase and/or decrease in the data rate for transmissions on the uplink.

Figure 4C:
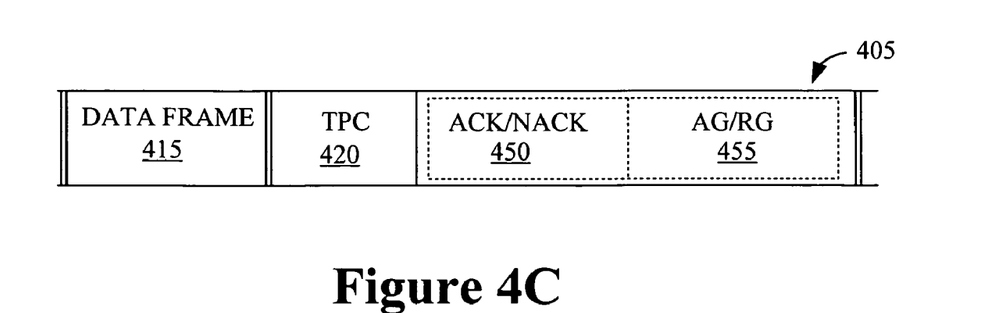

FIG. 4C conceptually illustrates the downlink data channel 400 and the downlink control channel 405 associated with the first dedicated downlink channel. In the illustrated embodiment, control information associated with the second downlink data channel 430 is mapped into a portion of the downlink control channel 405. For example, the acknowledgment/negative acknowledgement (ACK/NACK) field 450 and/or the absolute grant/relative grant (AG/RG) field 455 may be mapped into the transport format combination information (TFCI) field 425. As discussed above, the mapping of the control information associated with the second downlink data channel 430 into frames and/or subframes of the downlink control channel 405 may depend upon the transmit time interval associated with the downlink data channel 430 and/or the downlink control channel 405.

In one embodiment, the control information may be transmitted according to one or more constraints. For example, the ACK and NACK signals associated with each mobile unit are mutually exclusive. The AG and RG associated with each mobile unit are mutually exclusive as well. Accordingly, the ACK/NACK signal can be transmitted independently or jointly with the AG/RG signals. In alternative embodiments, different mappings may be used for transmitting only one part (e.g., ACK/NACK or AG/RG) or for transmitting the two parts together. While this is straightforward for 10 ms E-DCH TTI length, for 2 ms E-DCH TTI length a reduction of an AG number space may be required to permit transmission with the number of TFCI bits available on the downlink control channel (e.g., the DPCCH) within the 2 ms TTI length.

Figure 5:
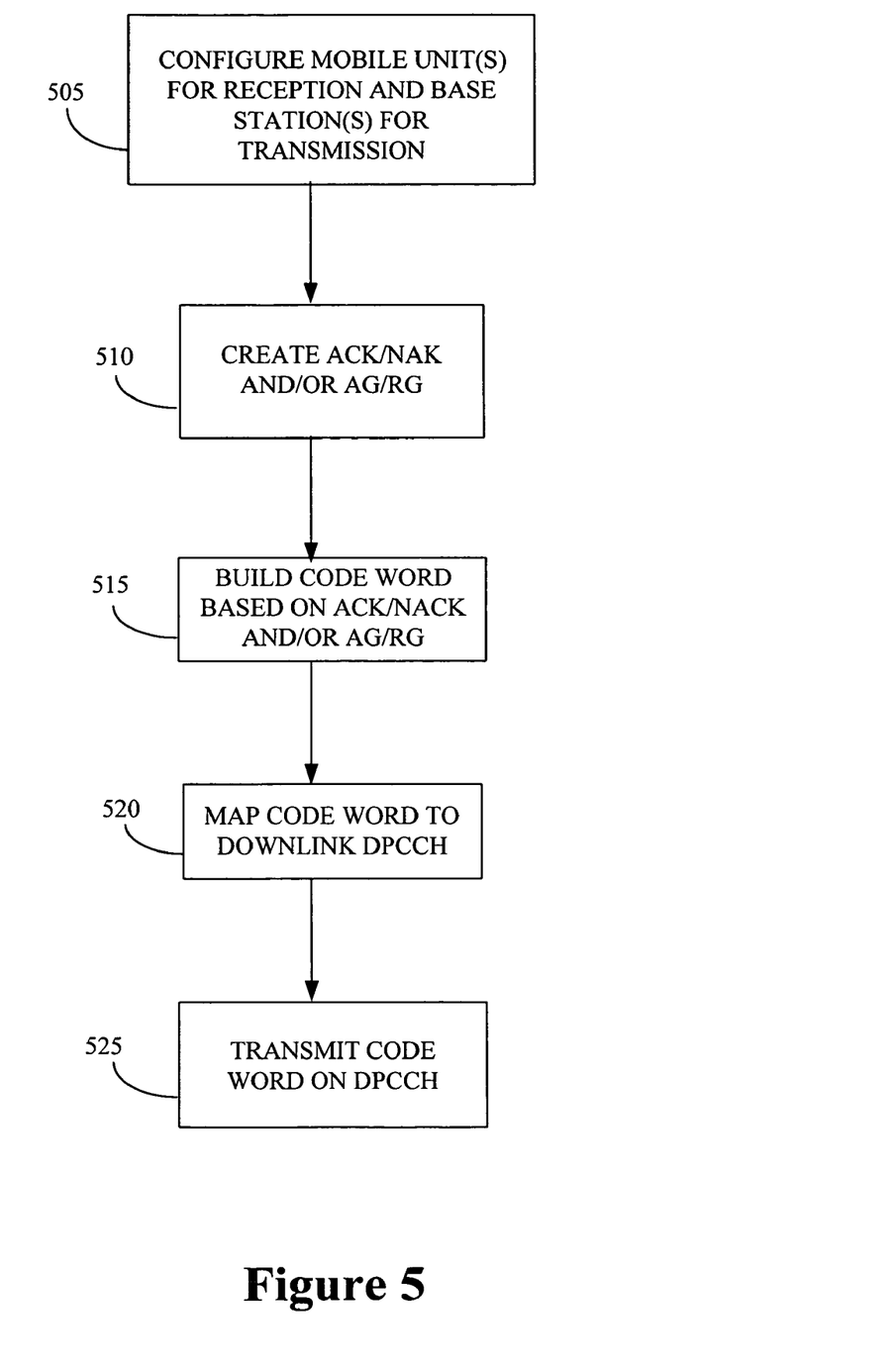
FIG. 5 conceptually illustrates one exemplary embodiment of a method of mapping control information to a downlink control channel, in accordance with the present invention.

FIG. 5 conceptually illustrates one exemplary embodiment of a method 500 for mapping control information to a downlink control channel. In the illustrated embodiment, one or more mobile units are configured (at 505) for reception over the downlink channels and one or more base stations are configured (at 505) for transmission over the downlink channels. For example, in a UMTS system, a radio network controller determines that a downlink DPCCH should be used for sending the control information (e.g., an ACK/NACK field and/or an AG/RG field) associated with data to be transmitted on the uplink E-DPDCH. The radio network controller may make this determination at setup of an E-DCH transport channel and/or during the lifetime of an already existing E-DCH.

The radio network controller (RNC) may then provide information to the mobile units, which may use the provided information to configure (at 505) the mobile unit for reception of the control information on the downlink DPCCH. The radio network controller (RNC) may also provide information to the base station(s), which may use the provided information to configure (at 505) the base station(s) for transmission of the control information. For example, the radio network controller may signal (at 505) the configuration to the mobile unit(s) and the base station(s) using radio resource control (RRC) protocol and node-B application protocol (NBAP) signaling, respectively. After successful reception of the messages and configuration (at 505), the mobile units will be configured to receive the control information over the downlink DPCCH instead of the downlink E-HICH, E-RGCH and E-AGCH, and the base stations will be configured to transmit the control information over the downlink DPCCH instead of the downlink E-HICH, E-AGCH, and E-RGCH.

The base station may form (at 510) control information such as the ACK/NACK and the AG/RG. For example, the base station may decode data for a specific HARQ process and creates (at 510) an ACK/NACK to indicate successful/non-successful reception of the data on the E-DCH. For another example, a base station scheduler may allocate a specific amount of resource to the mobile unit or to increment/decrement the amount of resources for that mobile unit. The base station may then create (at 510) an absolute and/or relative grant based on the allocated and/or incremented/decremented resource, respectively. The base station may then build (at 515) a code word from the control information, which may include the ACK/NACK and the AG/RG.

The code word may then be mapped (at 520) into one or more fields of the appropriate downlink control channel. For example, in a UMTS system, the ACK/NACK and/or AG/RG may be mapped (at 520) into the TFCI fields on the downlink DPCCH. For example, in a UMTS system, the base station transmits (at 525) the downlink control information on an associated downlink DPCCH. The code word may then be used to determine the control information, such as the ACK/NACK and/or the AG/RG. Furthermore, as the downlink DPCCH is time-aligned to the uplink DPCCH and E-DPDCH by a constant timing offset of 1024 chips, the time relation between data and control information can be easily maintained.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of wireless communication involving at least one mobile unit and at least one base station configured to exchange data over an air interface using first and second data channels and corresponding first and second control channels, the first control channel configured to carry control information associated with the first data channel and the second control channel configured to carry control information associated with the second data channel, the method comprising:

accessing control information associated with data to be transmitted over the first data channel;

mapping the control information for transmission over the air interface using the second control channel instead of the first control channel; and transmitting the data over the air interface on the first data channel concurrently with transmission of the mapped control information over the air interface on the second control channel.

2. The method of claim 1, wherein accessing the control information comprises accessing at least one of transport format combination indication, a retransmission sequence number, a happy bit, an acknowledgment bit (ACK), a negative acknowledgment bit (NACK), an absolute scheduling grant, and a relative scheduling grant.

3. The method of claim 1, wherein mapping the control information to the second control channel comprises mapping the control information to a transport format combination information field in the second control channel.

4. The method of claim 1, comprising forming at least one code word based on the control information.

5. The method of claim 4, comprising transmitting the data on the first data channel and concurrently transmitting said at least one code word on the second control channel.

6. The method of claim 5, wherein transmitting the data on the first data channel and concurrently transmitting said at least one code word on the second control channel comprises transmitting a data on an uplink data channel and concurrently transmitting said at least one code word on at least one of an uplink control channel and a downlink control channel.

7. The method of claim 5, wherein transmitting the data on the first data channel and concurrently transmitting said at least one code word on the second control channel comprises transmitting a data on an enhanced dedicated physical data channel and concurrently transmitting said at least one code word on a dedicated physical control channel.

8. The method of claim 7, wherein transmitting the data and concurrently transmitting said at least one code word comprises transmitting the data and concurrently transmitting said at least one code word such that a time relation between the data and the code word is maintained.

9. The method of claim 1, comprising receiving configuration information indicating that data is to be transmitted using the first data channel and control information is to be transmitted using the second control channel.

10. The method of claim 9, comprising configuring said at least one mobile unit for transmission of control information based on the received configuration information and configuring said at least one base station for reception of control information based on the received configuration information.

11. The method of claim 9, comprising configuring said at least one mobile unit for reception of control information based on the received configuration information and configuring said at least one base station for transmission of control information based on the received configuration information.

12. A method of wireless communication involving a radio network controller, at least one mobile unit and at least one base station configured to exchange data over an air interface using a first data channel and exchange control information over the air interface associated with the data over a first control channel, comprising:
  determining that the control information associated with data to be transmitted over the air interface using the first data channel is to be mapped to a second control channel configured to transmit, over the air interface, control information associated with a second data channel configured to carry data over the air interface; and
  providing information to said at least one mobile unit and said at least one base station indicating that control information associated with data to be transmitted over the air interface using the first data channel is to be mapped to the second control channel so that the mapped control information is transmitted over the air interface using the second control channel instead of the first control channel, said transmission being concurrent with transmission of the data over the air interface using the first data channel.

13. The method of claim 12, wherein determining that control information associated with data to be transmitted over the first data channel is to be mapped to the second control channels comprises determining that at least one of extended transport format combination indication, a retransmission sequence number, a happy bit, an acknowledgment bit (ACK), a negative acknowledgment bit (NACK), an absolute scheduling grant, and a relative scheduling grant is to be mapped to the second control channels.

14. The method of claim 12, wherein providing the information comprises providing information indicating that said at least one mobile unit is to be configured for transmission of control information and providing information indicating that said at least one base station is to be configured for reception of control information.

15. The method of claim 12, wherein providing the information comprises providing information indicating that said at least one mobile unit is to be configured for reception of control information and providing information indicating that said at least one base station is to be configured for transmission of control information.

16. The method of claim 12, wherein providing the information comprises providing the information using at least one of radio resource control signaling and node-B application protocol signaling.

* * * * *